United States Patent
Cantolino et al.

(10) Patent No.: US 8,578,770 B2
(45) Date of Patent: Nov. 12, 2013

(54) ENCAPSULATED LIQUID LEVEL SENSOR DEVICE

(75) Inventors: Christopher Cantolino, Bradenton, FL (US); Robert Dean Sells, Palmetto, FL (US)

(73) Assignee: Cantolino Industries, Inc., Sarasota, FL (US)

( * ) Notice: Subject to any disclaimer, the term of this patent is extended or adjusted under 35 U.S.C. 154(b) by 368 days.

(21) Appl. No.: 12/925,926

(22) Filed: Nov. 2, 2010

(65) Prior Publication Data

US 2012/0103089 A1      May 3, 2012

(51) Int. Cl.
*G01F 23/00*      (2006.01)

(52) U.S. Cl.
USPC .......................................... 73/290 R; 73/325

(58) Field of Classification Search
USPC ....................... 73/291–334, 290 R
See application file for complete search history.

(56) References Cited

U.S. PATENT DOCUMENTS

| | | | | |
|---|---|---|---|---|
| 4,126,857 A * | 11/1978 | Lancia et al. | ................. | 340/620 |
| 4,350,856 A * | 9/1982 | Shiratori et al. | ............. | 200/306 |
| 5,827,962 A * | 10/1998 | Guenther et al. | ............... | 73/308 |
| 6,274,397 B1 * | 8/2001 | Chien et al. | ..................... | 438/15 |
| 7,390,551 B2 * | 6/2008 | Amstutz et al. | ................. | 428/68 |
| 7,753,071 B2 * | 7/2010 | Wood | ............................ | 137/558 |
| 8,297,131 B2 * | 10/2012 | Hughes | ..................... | 73/861.08 |
| 2002/0189346 A1 * | 12/2002 | Thomson | .................... | 73/304 R |
| 2003/0173707 A1 * | 9/2003 | Becker et al. | ............ | 264/272.11 |
| 2006/0208915 A1 * | 9/2006 | Oakner et al. | ................. | 340/620 |
| 2009/0140866 A1 * | 6/2009 | Heilmann et al. | ............ | 340/605 |
| 2009/0268414 A1 * | 10/2009 | Lu | ................... | 361/736 |
| 2009/0291288 A1 * | 11/2009 | Kopannia et al. | ............. | 428/220 |
| 2010/0050756 A1 * | 3/2010 | Stewart | ...................... | 73/114.55 |

\* cited by examiner

*Primary Examiner* — Hezron E Williams
*Assistant Examiner* — Hoang Nguyen
(74) *Attorney, Agent, or Firm* — Arthur W. Fisher, III

(57) ABSTRACT

A method of encapsulating a liquid level sensor device within a protective monolithic block through over-molding a printed circuit board assembly supporting a plurality of electronic components and an external sensor that includes a pair of spaced apart sensor members extending from the protective monolithic block to sense the accumulation of condensate to a predetermined level within a collection reservoir from a condensate producing source within a polyamide adhesive.

11 Claims, 5 Drawing Sheets

ENCAPSULATED LIQUID LEVEL SENSOR DEVICE

BACKGROUND OF THE INVENTION

1. Field of the Invention

An encapsulated liquid level sensor device and a method of encapsulating the liquid level sensor device.

2. Description of the Prior Art

Sensors to monitor liquid levels are well known in the art. Such sensors often include a float member which rises and falls with the changing liquid level in a drain pipe, drain pan or tank. Float actuated switches are commonly used in equipment and systems to prevent overflow of liquid such as condensate in air conditioning and refrigeration systems.

Often such float sensors and switches have been replaced by more reliable electronic probe switch devices. These devices eliminate moving parts generally using instead, a pair of probe sensors for detecting rising water levels.

Further efforts have been undertaken to produce module structures to encapsulate electronic components on circuit boards to protect the components from the surrounding environment are represented by the patent documents discussed below.

U.S. 2002/0189346 relates to a device for sensing a level of a fluid including a microcontroller disposed within a housing and a probe coupled to the microcontroller. The microcontroller applies a given DC potential to the probe for a first period of time, measures a voltage associated with the level of the fluid to be sensed after the first period of time and applies a reference DC potential to the probe for a second period of time.

U.S. 2003/0173707 shows the use of polyamide based molding compositions for the production of moldings and for adhesive sealing or filling in the production of electrical or electronic devices, in particular of plugs, cables, switches, sensors, transponders and modules.

U.S. 2006/0003137 discloses a method of encapsulating a component assembly comprising a first layer having a first set of physical properties and a second layer having a second set of physical properties to protectively surround the component assembly. A continuous transitory material is formed between the first layer and the second layer at associated first and second margin portions such that the first layer and the second layer are not prone to delamination.

U.S. 2006/0171127 describes a control unit including a plurality of electronic parts sealed with a resin.

U.S. 2006/0208915 discloses a liquid level control switch comprising a plurality of electronic components enclosed in a case including electrically conductive sensor-probe pins extend from a PC board and are positioned for detecting liquids at various levels within drains, drain pans, tanks, reservoirs and pipes of various dimensions.

U.S. 2008/0179962 relates to a leak detector pad comprising a circuit board having a bottom surface and a top surface, spaced first and second electrically conductive traces located on the bottom surface, and an electronic circuit mounted on the top surface.

U.S. 2009/0140866 shows a sensor for detecting the presence of a liquid comprising a housing having a concave upper surface, a concave lower surface, and a peripheral wall connecting the upper surface and the lower surface. A plurality of apertures are formed in the wall. A plurality of electrically conductive members extend above the upper surface and below the lower surface and are separated from one another by a gap in which a liquid can accumulate. The electrically conductive members are configured to generate an output signal when a conductive liquid comes into contact with the electrically conductive members and bridges the gap. An output connector is coupled to the plurality of electrically conductive members and is configured to carry the output signal.

U.S. 2009/0268414 teaches an over-molded electronic module includes a frame, an electronic assembly and a polymeric body. The frame includes a sidewall that defines an opening to provide a position for the electronic assembly. The polymeric body is formed of a polymeric composition encapsulating both sides of the electronic assembly and a portion of the frame.

U.S. 2009/0291288 relates to a molded part for bonding to metal or plastic substrates for use as a fastening element comprising a hot melt adhesive based on polyamide, polyolefins, polyesters, polyacrylates or polystyrene.

U.S. 2009/0295027 discloses electrical components mounted on a circuit board sealed within a frame tray of a curable material that encapsulates the circuit board. The electrical components of the circuit board are positioned and sealed within the frame tray such that the cured material does not affect an airflow path which dissipates heat produced by the electrical components during use. The curing of the curable material shields the circuit board from moisture, dust and other environmental contaminates.

U.S. 2010/0050756 shows a drain pan level monitoring system comprising a level sensor to generate a level sensor output signal related to a sensed level of condensation buildup within a drain pan.

SUMMARY OF THE INVENTION

The present invention relates to a liquid level sensor device to selectively control the operation of an HVAC unit when condensate from the HVAC unit reaches a predetermined level within a condensate collector such as a primary or secondary drain pan.

The liquid level sensor device comprising a protective monolithic block having a printed circuit board assembly and a pair of liquid level sensor pins or members coupled to the printed circuit board assembly projecting downwardly below the lower surface of the protective monolithic block to generate to signal to disable the HVAC when condensate reaches a predetermined level within a drain pan.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
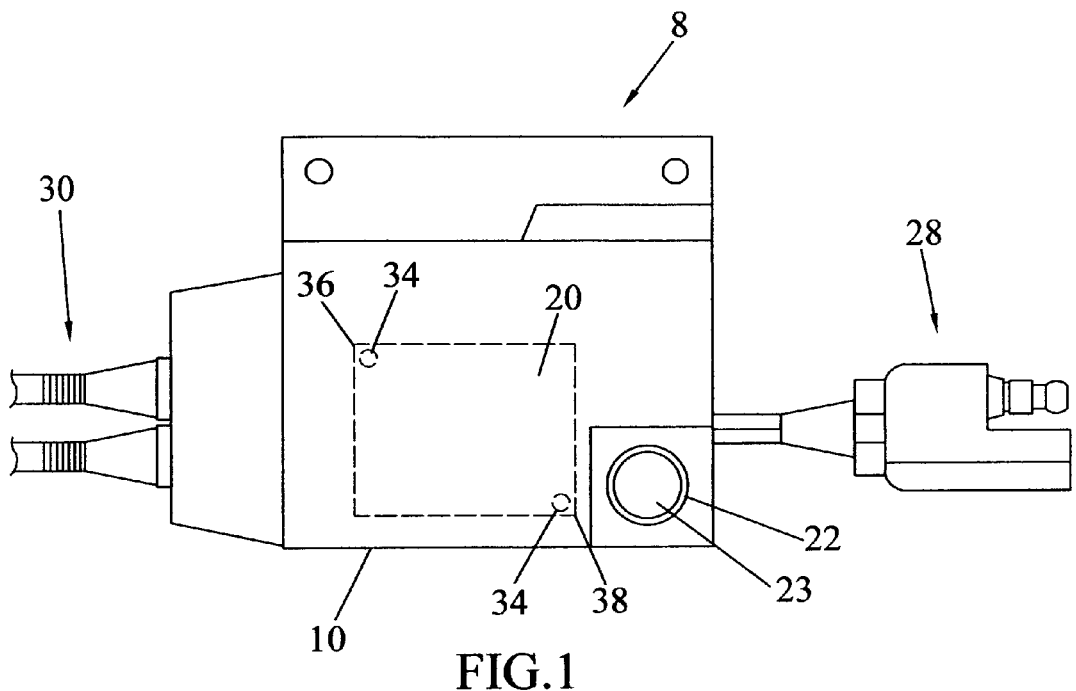
FIG. 1 is a top view of the encapsulated liquid sensor device of the present invention.
Figure 2:
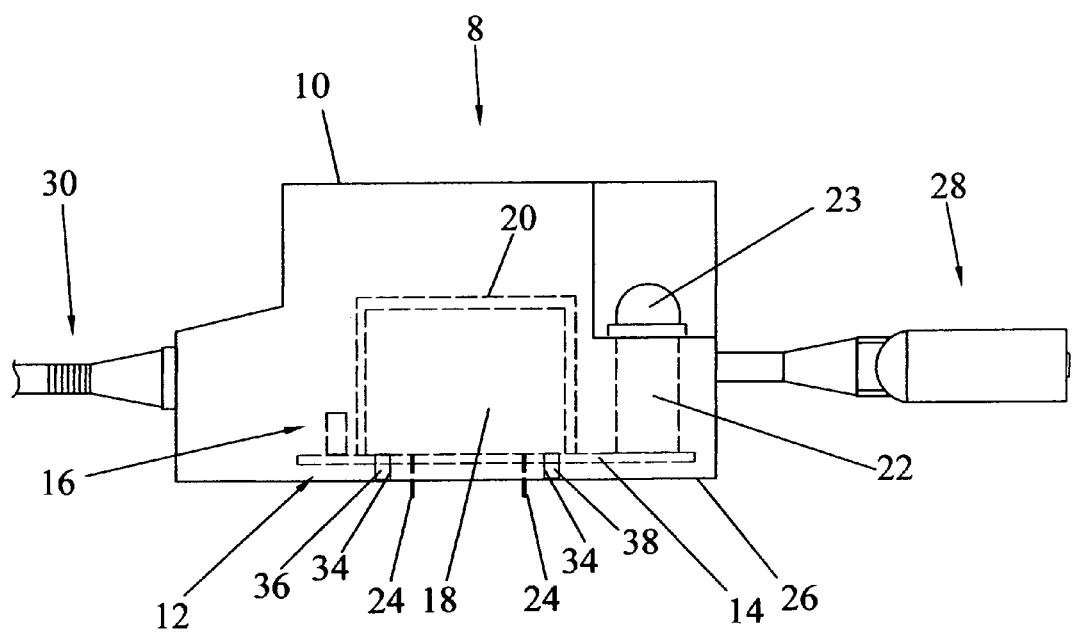
FIG. 2 is a side view of the encapsulated liquid sensor device of the present invention.
Figure 3:
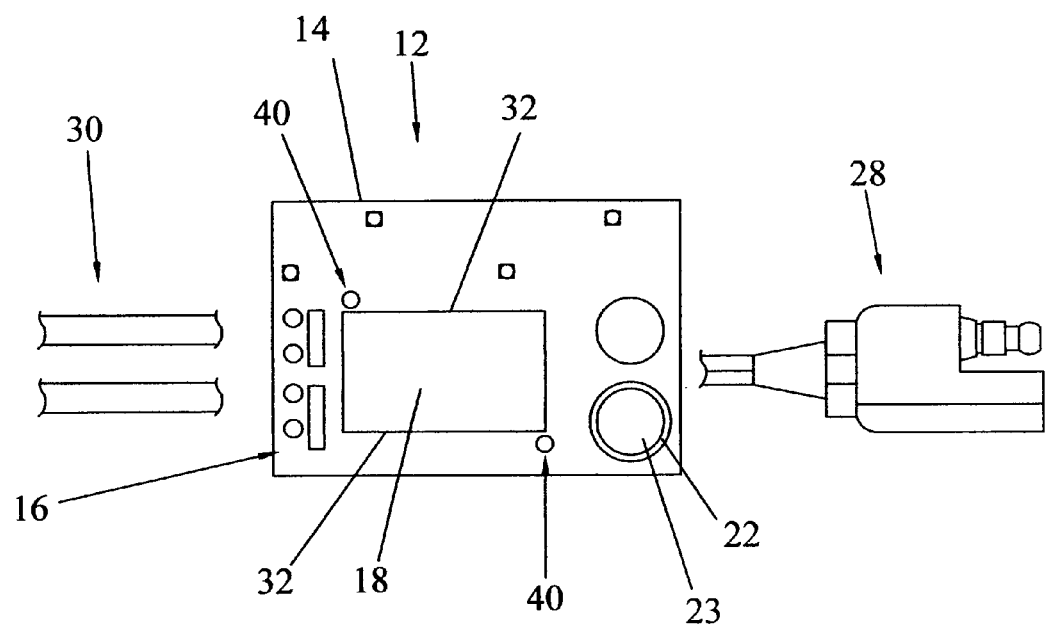
FIG. 3 is a top view of the printed circuit board assembly of the liquid level sensor device of the present invention.
Figure 4:
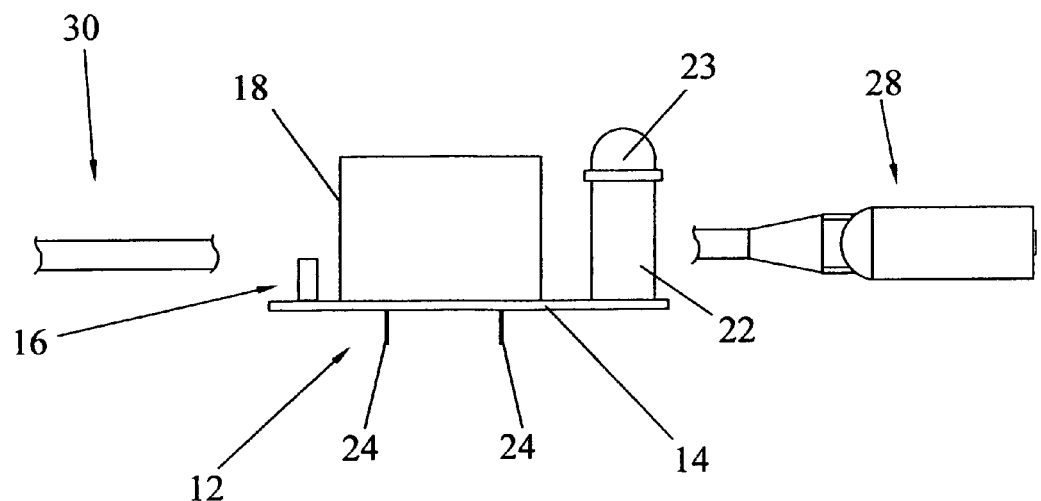
FIG. 4 is a side view of the printed circuit board assembly of the liquid level sensor device of the present invention.
Figure 5:
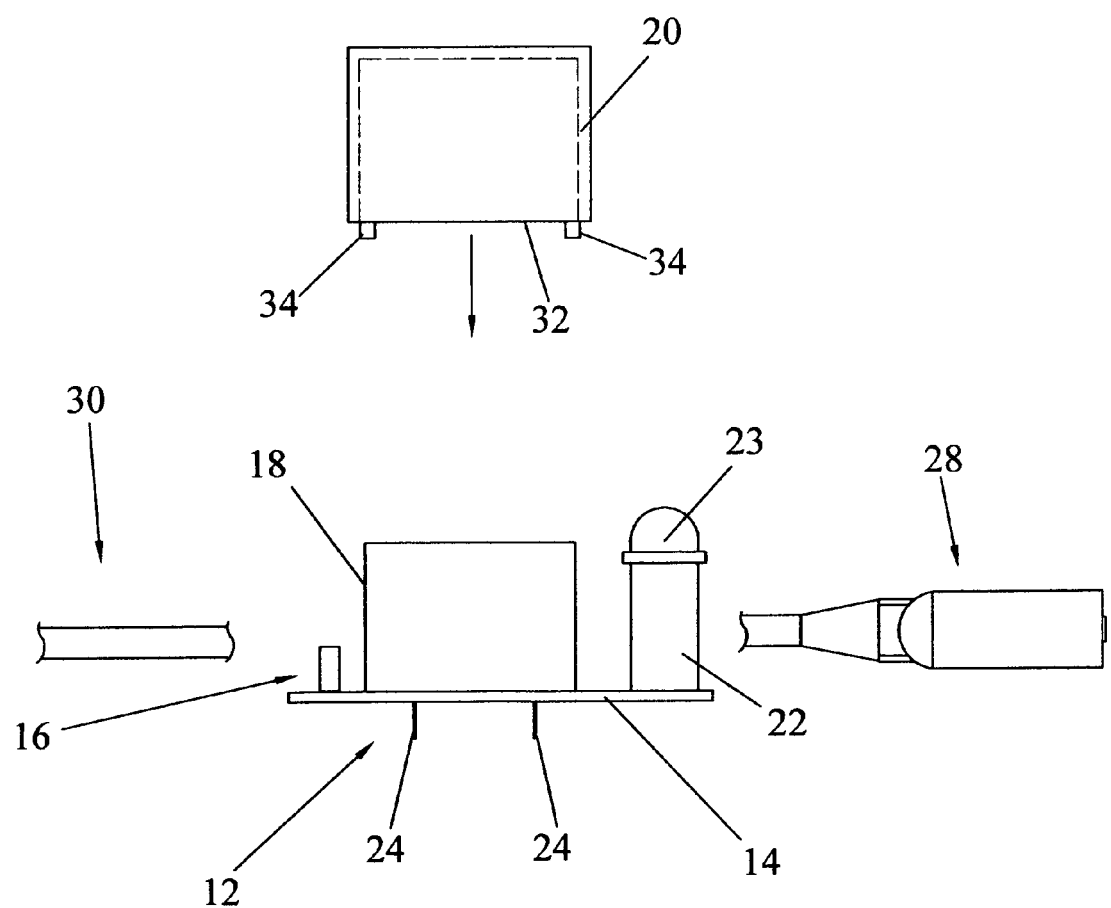
FIG. 5 is a side view of the printed circuit board assembly of the liquid level sensor device of the present invention with the protective relay housing of the present invention.

The present invention relates to a liquid level sensor device to selectively control the operation of an HVAC unit when condensate from the HVAC unit reaches a predetermined level within a condensate collector such as a primary or secondary drain pan.

Specifically, as best shown in FIGS. 1 through 5, the present invention relates to an encapsulated liquid level sensor device generally indicated as 8 comprising a protective monolithic block 10 having a printed circuit board assembly generally indicated as 12 including a printed circuit board 14 supporting a plurality of electronic components generally indicated as 16 and a relay 18 enclosed within a relay cover or protective shroud 20 disposed therein. A lamp or visual indicator 22 including a lens 23 coupled to the electronic components 16 of the printed circuit board assembly 12 extends upwardly from the top of the protective monolithic block 10; while, a pair of liquid level sensor pins or members each indicated as 24 coupled to the electronic components 16 of the printed circuit board assembly 12 project downwardly below the lower surface 26 of the protective monolithic block 10 to generate a signal to disable the HVAC (not shown) and to illuminate the lamp or visual indicator 22 when condensate reaches a predetermined level with a drain pan (not shown) as described more fully hereinafter.

The electronic components 16, the relay 18, the lamp or visual indicator 22 and the liquid level sensor pins or member 24 are operatively coupled between the HVAC (not shown) and a power supply (not shown) by a connector/conductor assembly generally indicated as 28 and a conductor/cable assembly generally indicated as 30.

Figure 6:
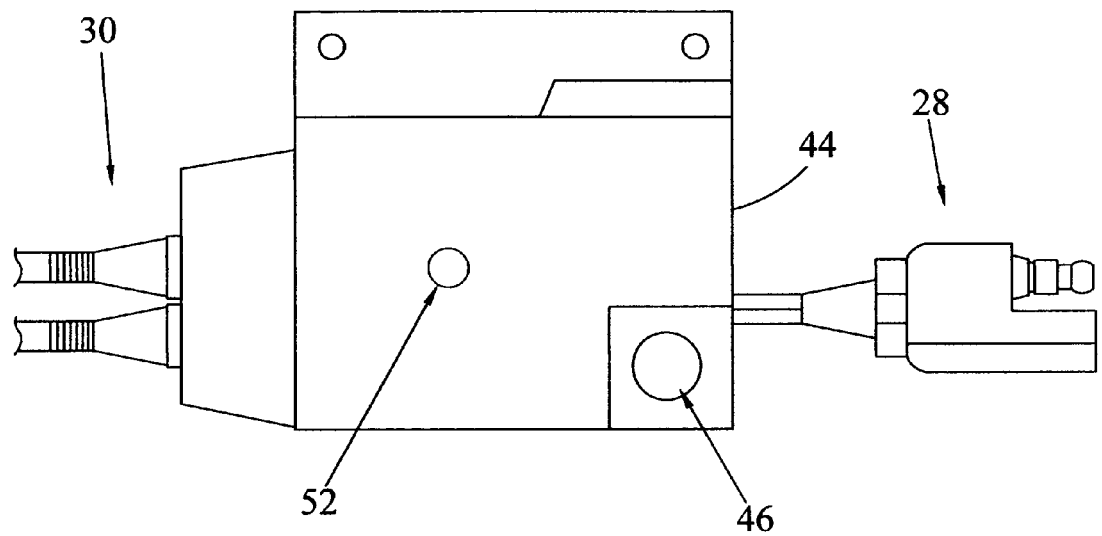
FIG. 6 is a top view of the liquid level sensor device of the present invention and the encapsulating mold.
Figure 7:
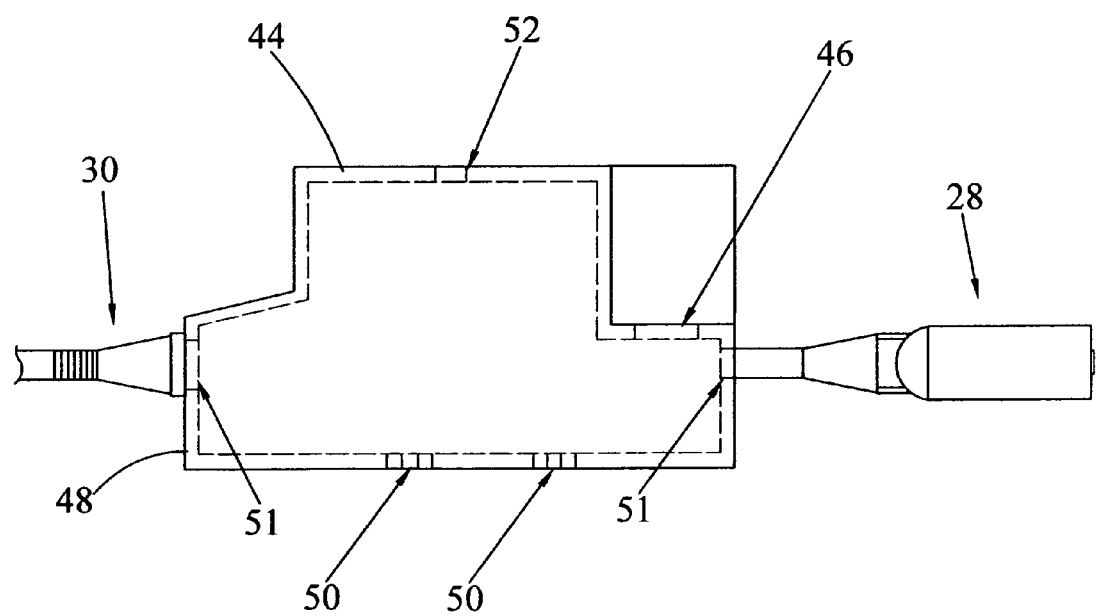
FIG. 7 is a side view of the liquid level sensor device of the present invention and the encapsulating mold.
Figure 8:
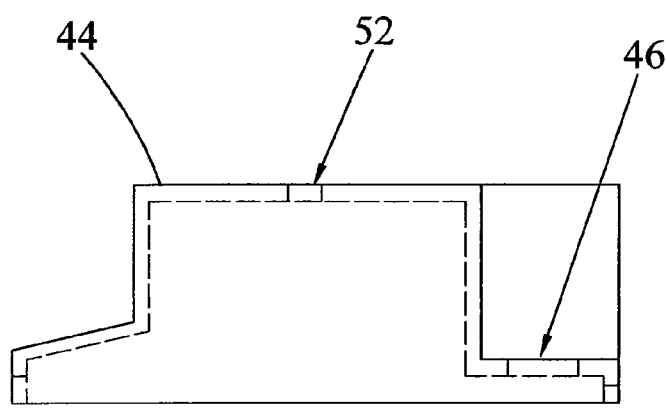
FIG. 8 is an exploded side view of the upper modular block and the lower modular block of the encapsulating mold.
Figure 8:
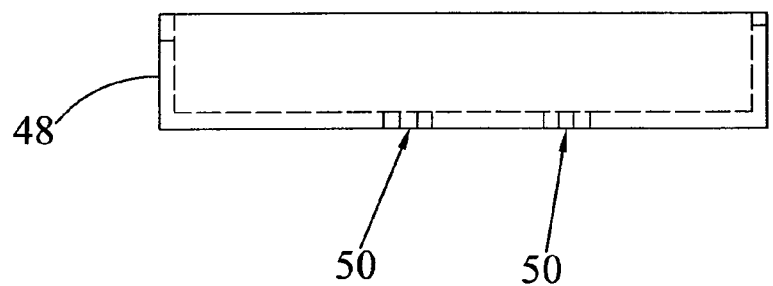

The method of producing the encapsulated liquid level sensor 8 is best understood with references to FIGS. 6 through 8.

The initial step in the over molding process is the application of adhesive to the edges 32 of the relay 18. The relay cover or protective shroud 20 is then positioned over the relay 18 by aligning a pair of alignment pins each indicated as 34 disposed diagonally on the lower edge of opposite corners 36 and 38 of the relay cover or protective shroud 20 over a corresponding alignment aperture 40 (FIG. 3) formed in the printed circuit board 14. When so aligned, the relay cover or protective shroud 20 is snapped or press-fitted into the corresponding alignment aperture 40 and pressed onto the upper surface of the printed circuit board 14 engaging the adhesive on or adjacent the relay 18 to secure the relay cover or protective shroud 20 in place in surrounding relationship relative to the relay 18.

An upper modular block 44 including a lens aperture 46 formed therethrough and a lower modular block 48 including a pair of sensor pin or member apertures each indicated as 50 formed therethrough of a molding die are positioned in surrounding relationship relative to the printed circuit board assembly 12, plurality of electronic components 16, relay cover or protective shroud 20, and lamp or visual indicator 22 with the lens 23 extending through the lens aperture 46 and each pair of liquid level sensor pins 24 extending through the corresponding sensor pin or member aperture 50. The connector/conductor assembly 28 and the conductor/cable assembly 30 extend through a corresponding aperture each indicated as 51 (FIG. 7) formed on opposite ends of the mold die. Each aperture may be cooperatively formed by correspondingly cutout portions in adjacent edges of the upper modular block 44 and the lower modular block 48 to fit tightly around the connector/conductor assembly 28 and the conductor/cable assembly 30.

A low pressure molding resin such as a polyamide based hot-melt adhesive with a melt range of from about 120° C. to about 180° C. and a viscosity of from about 2500 cP to about 5000 cP at about 210° C. is then injected through a gate 52 of the molding die. The injection pressure is at least 30 psig but preferably from about 60 psig to about 300 psig. The hot-melt adhesive, low pressure adhesive is allowed to set or solidify.

Finally, the upper modular block 44 and the lower modular block 48 of the molding die are removed.

The electronic components 16, the relay 18 and the pair of liquid level sensor pins or members 24 comprise the control circuit coupled to the HVAC unit allowing HVAC unit to operate under normal conditions. So long as the liquid level with the HVAC condensate drain pan (not shown) is below a predetermined level the tips of the pair of liquid level sensor pins or members 24 remain above the liquid. However, in the event there is a blockage or other abnormality in the drainage system that prevents free flowing drainage of the liquid through the drainage system, the liquid level within the HVAC condensate drain pan will rise until the tips of the pair of liquid level sensor pins or members 24 are submerged in the condensate. When this occurs, a conductive path is created between the tips of the pair of liquid level sensor pins or members 24 causing the relay 18 to open to interrupt operation of the HVAC system. In addition, the lamp or visual indicator 22 will illuminate to indicate the open circuit condition. The circuit remains open, with the HVAC unit or system inoperable, until the condensate recedes below the tips of the pair of liquid level sensor pins or members 24 at which time the HVAC unit returns to normal operating condition.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of encapsulating a liquid level sensor device within a protective monolithic block through over-molding a printed circuit board assembly supporting a plurality of electronic components and a sensor to sense the accumulation of condensate to a predetermined level within a collection reservoir from a condensate producing source comprising:
    (a) mounting the plurality of electronic components to the upper surface of the printed circuit board;
    (b) mounting the external sensor to the lower surface of the printed circuit board;
    (c) mounting a relay to the upper surface of the printed circuit board;

(d) enclosing the relay within a protective relay cover by aligning at least two alignment pins disposed on the lower portion of the protective relay cover over a corresponding alignment aperture formed in the printed circuit board to align the protective relay cover over the relay and placing the alignment pins through the alignment apertures extending through the printed circuit board;

(e) sealing the relay cover on the upper surface of the printed circuit board in surrounding relationship relative to the relay to isolate the relay from the monolithic block;

(f) placing the printed circuit board and relay/relay cover within a mold comprising an upper modular block including a resin filling gate and a lower modular block including a sensor aperture to receive a portion of the sensor therein such that the alignment pins engage the upper surface of the lower module block to support the printed circuit board in spaced relationship relative to the lower module block;

(g) filling the mold with a low pressure molding resin through the resin filling gate;

(h) allowing the low pressure molding resin to set to form the protective monolithic block entirely around the printed circuit board, relay, protective relay cover and the upper portion of the sensor and (i) removing the liquid level sensor device encapsulated in the protective monolithic block from the mold.

2. The method of claim 1 wherein the low pressure molding resin is a polyamide based hot-melt adhesive.

3. The method of claim 2 wherein the low pressure molding resin has a melt range of from about 120° C. to about 180° C. and a viscosity of from about 2500 cP to about 5000 cP at about 210° C.

4. The method of claim 3 wherein the injection pressure is at least 30 psig.

5. The method of claim 1 wherein the low pressure molding resin is a polyamide based hot-melt adhesive with a melt range of from about 120° C. to about 180° C. and a viscosity of from about 2500 cP to about 5000 cP at about 210° C. injected through the gate at an injection pressure of at least 30 psig.

6. The method of claim 1 wherein the liquid level sensor device includes a visual indicator and the upper modular block further includes a lamp aperture to receive at least a portion of the visual indicator.

7. An encapsulated liquid level sensor device to selectively control the operation of a condensate producing system when condensate from the condensate producing system reaches a predetermined level within a condensate collector such as a primary or secondary drain pan comprising:

(a) a protective monolithic block including a lower modular block having a printed circuit board assembly in spaced relationship relative to said lower modular block of said protective monolithic block including a printed circuit board supporting a plurality of electronic components and a relay enclosed within a relay cover having a visual indicator coupled to said electronic components of said printed circuit board assembly extending upwardly from the top of said protective monolithic block;

(b) said protective relay cover including at least two alignment pins disposed on the lower portion thereof extending through corresponding alignment apertures formed in said printed circuit board to align said protective relay cover over said relay; and (c) said relay cover sealed on the upper surface of said printed circuit board in surrounding relationship relative to said relay to isolate said relay from said monolithic block.

8. The encapsulated liquid level sensor device of claim 7 wherein said protective monolithic block is molded from a low pressure molding resin.

9. The encapsulated liquid level sensor device of claim 8 wherein said low pressure molding resin comprises a polyamide based hot-melt adhesive.

10. The encapsulated liquid level sensor device of claim 8 wherein said low pressure molding resin comprises a melt range of from about 120° C. to about 180° C. and a viscosity of from about 2500 cP to about 5000 cP at about 210° C.

11. The encapsulated liquid level sensor device of claim 8 wherein said injection pressure is at least 30 psig but preferably from about 60 psig to about 300 psig.

\* \* \* \* \*